United States Patent [19]

Yada

[11] Patent Number: 5,061,078
[45] Date of Patent: Oct. 29, 1991

[54] INTERNAL MIXER

[75] Inventor: Yasuo Yada, Yokkaichi, Japan

[73] Assignee: Suzuka Engineering Co., Ltd., Yokkaichi, Japan

[21] Appl. No.: 533,390

[22] Filed: Jun. 5, 1990

[30] Foreign Application Priority Data

Jun. 13, 1989 [JP] Japan .................. 1-150044

[51] Int. Cl.⁵ .......................... B01F 7/02; B01F 15/02
[52] U.S. Cl. ........................................ 366/76; 91/168;
92/52; 92/62; 92/86; 92/117 A; 100/146;
366/77; 366/84; 366/97; 366/191; 366/291;
366/297; 425/201; 425/203; 425/209
[58] Field of Search ............... 366/75, 76, 83, 84,
366/85, 96, 97, 139, 150, 297-301, 77, 290, 291,
293, 191; 425/200, 201, 203-205, 207, 209, 583;
100/145-146, 140, 141; 92/52, 62, 86, 117, 129;
91/168

[56] References Cited

U.S. PATENT DOCUMENTS

| | | | |
|---|---|---|---|
| 2,351,706 | 6/1944 | Robinson | 366/76 |
| 2,446,657 | 8/1948 | MacLeod et al. | 366/76 |
| 2,680,264 | 6/1954 | MacLeod | 366/75 |
| 2,813,300 | 11/1957 | Hausman | 366/96 X |
| 2,972,774 | 2/1961 | MacLeod | 366/77 |
| 2,985,909 | 5/1961 | Smith et al. | 366/297 X |
| 3,302,535 | 2/1967 | Procter et al. | 92/52 |
| 3,572,645 | 3/1971 | Matsuoka | 366/76 |
| 4,830,506 | 5/1989 | Borzenski | 366/97 X |
| 4,877,328 | 10/1989 | Muller et al. | 366/97 X |

FOREIGN PATENT DOCUMENTS

| | | | |
|---|---|---|---|
| 3502538 | 8/1985 | Fed. Rep. of Germany | 92/86 |
| 3426442 | 12/1985 | Fed. Rep. of Germany | 425/201 |
| 7238 | 1/1982 | Japan | 366/96 |

Primary Examiner—Harvey C. Hornsby
Assistant Examiner—C. Cooley
Attorney, Agent, or Firm—Oblon, Spivak, McClelland, Maier & Neustadt

[57] ABSTRACT

Described herein is an internal mixer of the type including a mixing chamber rotatably accommodating mixing rotors therein, a hopper frame erected on the mixing chamber, a charge hopper provided on one lateral side of the hopper frame for charging a mixing material therethrough, and a floating weight provided in the hopper frame for upward and downward movements therein, the floating weight being held in an upper lifted position when charging a mixing material into the mixing chamber and then lowered into a pressing position in a mixing stage to apply pressure on the charged material in the mixing chamber, wherein the floating weight is dimensioned to have an axial length sufficient for closing an inlet opening formed in the side wall of the hopper frame in communication with the charge hopper, when in the lower pressing position, and lift means for lifting the floating weight up and down in the hopper frame is provided separately from a pressing means with a function of pressing the floating weight resiliently against the mixing material, the lift means being constituted by a hydraulic cylinder formed internally of the floating weight.

10 Claims, 6 Drawing Sheets

INTERNAL MIXER

BACKGROUND OF THE INVENTION

1. Field of the Invention

This invention relates to an internal mixer which is suitable for mixing various materials such as rubber, plastics, ceramics and the like.

2. Description of the Prior Art

Shown in FIG. 5 is a typical example of the internal mixers of this sort which have thus far been known and used in the art, including a couple of mixing rotors 2 which are connected to a drive source, not shown, and rotatably accommodated in a mixing chamber 1 in a fluid tight condition. A floating weight 4 is vertically movably fitted in a hopper frame 3 which is extended upward from the mixing chamber 1. The floating weight 4 is suspended on the distal end of a piston rod 6 which is extended downward from an air cylinder 5 to move the floating weight 4 up and down with pneumatic pressure. When the floating weight 4 is in the upper lifted position as shown in FIG. 5 (in a non-mixing stage), the mixing chamber 1 and charge hopper 7 are in an open state to receive a charge of mixing material in the mixing chamber 1. On the other hand, when the floating weight 4 is in the lower position (in a mixing stage), the mixing chamber 1 is closed, secluded from the hopper 7, while the floating weight 4 is pushed against the charged material in the mixing chamber 1 by pneumatic pressure and caused to float up and down repeatedly according to the movements of the charged material which is being mixed by the rotors 2. The upward and downward floating or sinking actions of the floating weight 4 accelerate the mixing of the charged material favorably to produce sufficient mixing and dispersing effects.

However, in a case where the above-mentioned prior art mixer is used, for example, in a vehicular tire manufacturing plant under such an operating condition where the floating weight 4 is moved up and down at a frequency of more than one time per minute, the operation involves consumption of a large quantity of compressed air which is extremely uneconomical. Besides, in a case where a high pressure is applied to the mixing material through the floating weight 4 in an initial stage of the mixing operation for the purpose of producing accelerated mixing effects to attain higher productivity, difficulties are encountered in carrying out the operation in an efficient and economical manner because it takes time to build up a high pressure due to the influence of the compressibility of air in the air cylinder of a large capacity despite the increased consumption of compressed air.

There has been another problem that, when lifting up and down the floating weight 4 or when pressing the mixing material with the floating weight 4, powder of the mixing material erupts into upper portions of the hopper frame 3 through the clearance around the floating weight 4 and deposits on the upper surface of the floating weight 4. Therefore, in order to ensure that the entire amount of the charged material be mixed and dispersed into a final product, the deposited powder has to be swept into the mixing chamber 1 at predetermined time intervals although it is very troublesome from the standpoint of machine operation. For instance, in the conventional batch type internal mixer, the powder which has been blown up in the mixing stage and deposited on the upper surface of the floating weight needs to be swept off by lifting up the floating weight one or two times before completion of one batch of mixing operation, prolonging the mixing time and as a result inevitably lowering the productivity by interruptions of the operation.

SUMMARY OF THE INVENTION

It is an object of the present invention to provide an internal mixer of a small size, which is capable of a highly productive and economical operation free of the possibilities of mixing material powder erupting out of the mixing chamber and depositing on the upper surface of the floating weight.

In accordance with the present invention, for achieving the above-stated object, there is provided an internal mixer of the type including a mixing chamber rotatably accommodating mixing rotors therein, a hopper frame erected on the mixing chamber, a charge hopper provided on a lateral side of the hopper frame for charging a mixing material therethrough, and a floating weight provided in the hopper frame for upward and downward movements therein, the floating weight being held in a lifted position when charging a mixing material into the mixing chamber and then lowered in a mixing stage to apply pressure on the charged material in the mixing chamber, characterized in that: the floating weight is dimensioned to have an axial length sufficient for closing an inlet opening in the side wall of the hopper frame in communication with the charge hopper when in the lowered pressing position; and a lift means for lifting the floating weight up and down in the hopper frame is provided separately from a pressing means adapted to press the floating weight resiliently against the mixing material, the lift means being constituted by a hydraulic cylinder mechanism including a lift cylinder formed internally of the floating weight, a piston slidably received in the lift cylinder and a piston rod extended downward from the piston into the hopper frame through a liquid tight seal.

The mixer of the invention is adapted to lift the floating weight up and down with hydraulic pressure, so that there is no need for discharging the compressed air on each lifting operation as in the conventional mixer. This is very economical and, thanks to the use of hydraulic pressure which is free of the problem of compressibility, contributes to improve the mixing effect and productivity by prompt application of high pressure in a case where the mixing material is pressed with high pressure in an initial stage of the mixing operation.

Since a hydraulic lifting cylinder of a large stroke length is formed internally of the floating weight, it becomes possible to reduce the height of the mixer as a whole and its installation space to a marked degree as compared with the mixer which has a hydraulic cylinder at the upper end of the hopper frame.

Further, as the floating weight which is pressed against the charged material is moved up and down during the mixing operation, air in the mixing chamber is repeatedly inhaled and exhaled through the clearance between the floating weight and hopper frame, accompanied by inward and outward movements of powder of the mixing material in the clearance. However, when in the lowered position, since the floating weight is long in the axial direction, it forms an elongated clearance along the inner wall surface of the hopper frame, so that, while flowing through the clearance, the pressure of air jets is abruptly attenuated by frictional resistance to such a degree as to preclude scattering of the mixing material powder from the charge hopper. Consequently, halfway through the clearance the powdery mixing material falls by gravity without depositing on the upper surface of the floating weight.

The above-mentioned pressing means which presses the floating weight against the mixing material may be constituted by a pneumatic cylinder with a short stroke length, which is provided, for example, in a top portion of the hopper frame and which has its piston rod linked with the piston rod of the above-mentioned hydraulic lift cylinder. In this instance, it is desirable to link the two piston rods through an universal joint which is capable of absorbing vibrations.

For the purpose of more securely preventing the mixing material powder from erupting into the back pressure chamber, it is desirable to provide a dust seal which is located above the hopper opening in the side wall of the hopper frame and held in sliding contact with the floating weight to block eruption of the mixing material powder.

In this case, the eruption of the mixing material powder into the back pressure chamber can be prevented more securely by connecting the back pressure chamber behind the floating weight to a pressurized air source, maintaining the internal pressure of the back pressure chamber at a level higher than that of the mixing chamber.

Further, the back pressure chamber may be connected to a dust collector, discharging the compressed air in the back pressure chamber through the dust collector to collect dust from the exhaust air at the time of uplifting the floating weight.

Furthermore, it is desirable to provide a liquid collecting means in order to prevent leaked operating liquid of the hydraulic lift cylinder from mingling into the mixing material. Such a liquid collecting means may be constituted by a liquid collecting groove and a liquid sink formed side by side on the top surface of the floating weight to collect the pressurized operating liquid leaking from the lift cylinder, a suction nozzle so located in the hopper frame as to be plunged into the sink when the floating weight is elevated to the upper position in the hopper frame and connected through a solenoid valve to a liquid separation vessel maintained constantly at a reduced pressure by means of a vacuum pump, a sensor for detecting the elevation of the floating weight in the upper lifted position, and a control unit adapted to open the solenoid valve in response to a floating weight detection signal from the sensor.

The above and other objects, features and advantages of the invention will become apparent from the following description and the appended claims, taken in conjunction with the accompanying drawings which show by way of example preferred embodiments of the invention.

DESCRIPTION OF PREFERRED EMBODIMENTS

Figure 1:
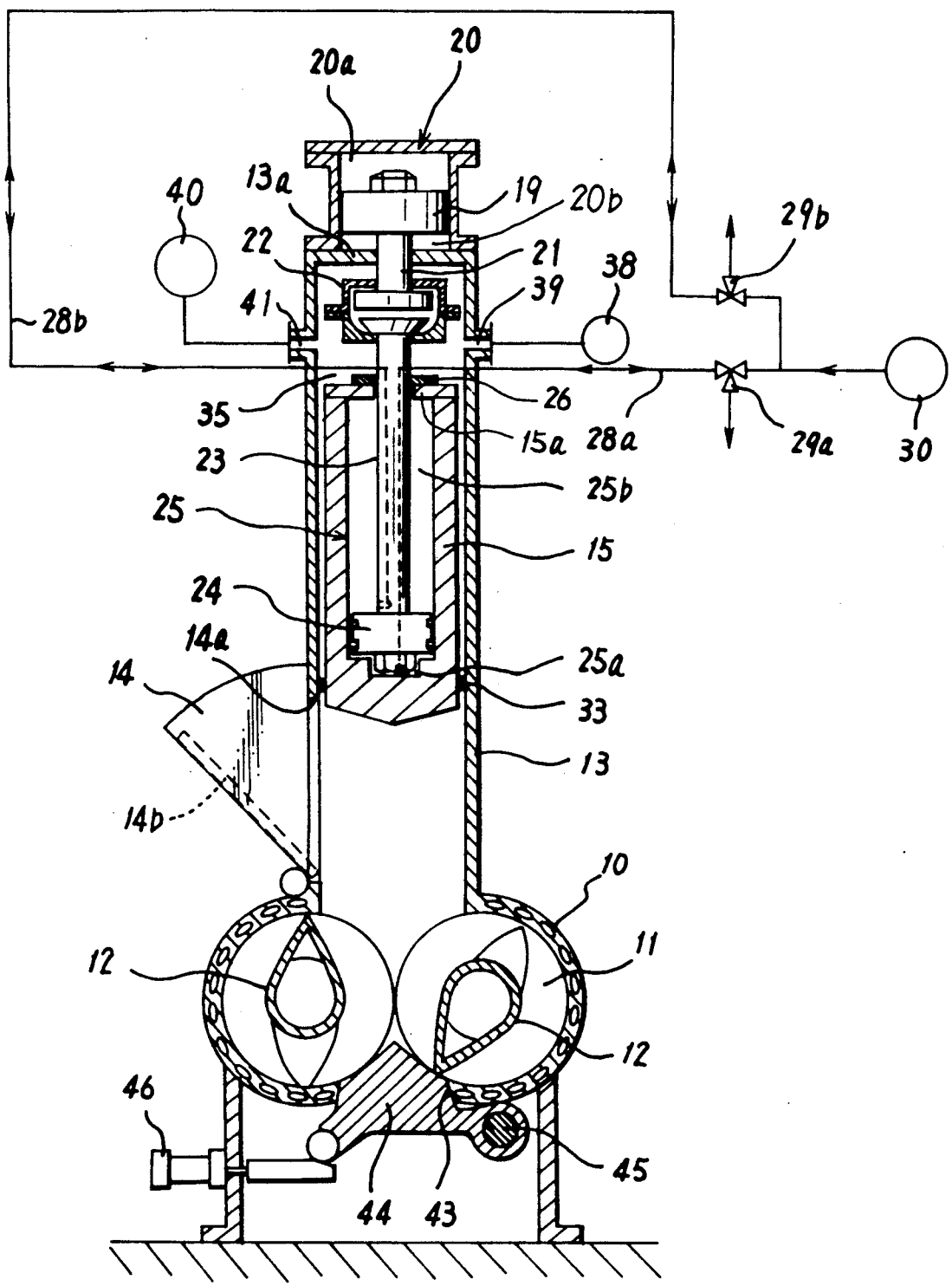
FIG. 1 is a sectional view of an internal mixer embodying the present invention, showing the mixer in a non-mixing stage.

Now, the invention is described more particularly by way of the preferred embodiments shown in the drawings.

Referring to FIG. 1, indicated at 10 is a casing which internally defines a mixing chamber 11, and at 12 are a pair of mixing rotors which are rotatably received in the mixing chamber 11 and rotationally driven from a drive source which is not shown. The casing 10 is provided with a hopper frame 13 rising upward from the mixing chamber 11. A charge hopper 14 for charging a mixing material is opened laterally into a lower end portion of the hopper frame 13 through an opening 14a with a door 14b. A floating weight 15 is fitted in the hopper frame 13 for upward and downward movements therein. The floating weight 15 is lifted up when charging a mixing material such as rubber, plastics, ceramics or the like into the mixing chamber 11, and then lowered and pressed against the charged material while the latter is mixed by the mixing rotors 12.

The mixer of the invention employs two separate fluid cylinders, one as a lift means with a large stroke length for lifting the floating weight up and down and the other one as a pressing means with a short stroke length for pressing the floating weight resiliently against the charged material. Namely, the mixer employs a pneumatic cylinder mechanism as the pressing means, including a pressing cylinder 20 mounted on a top portion of the hopper frame 13, a piston 19 slidably received in the cylinder 20 and a first piston rod 21 having the upper end thereof connected to the piston 19 and the lower end extended downward into the hopper frame 13 hermetically through a partition wall 13a. On the other hand, a hydraulic cylinder mechanism which constitutes the lift means includes a lift cylinder 25 formed internally of the floating weight 15, a piston 24 slidably received in the cylinder 25, and a second piston rod 23 having the lower end thereof connected to the piston 24 and the upper end extended upward into the hopper frame 13 through top wall 15a of the floating weight 15 in a liquid tight arrangement. The first and second piston rods 21 and 23 are linked to each other through a vibration absorbing universal joint 22. Denoted at 26 is a seal member to seal the second piston rod 23.

As mentioned hereinbefore, the hydraulic lift cylinder of a larger stroke length is formed internally of the floating weight 15 which is received in the hopper frame 13, so that the mixer can be reduced in height and size to a marked degree as compared with a mixer which has a hydraulic cylinder mounted on the upper end of a hopper frame.

Head and rod chambers 25a and 25b of the lift cylinder 25 are connected to a pressurized liquid source 30 via pipes 28a and 28b and through change-over valves 29a and 29b, such that the pressurized liquid is supplied selectively to and from the two chambers by switching the valves 29a and 29b to lift the floating weight 15 up and down within the hopper frame 13. Head chamber 20a of the pressurizing cylinder 20 is supplied with compressed air of a predetermined pressure to press the floating weight 15 against the mixing material. Due to compressibility of air, the floating weight 15 is permitted to float up and down according to the movements of the mixing material.

Figure 2:
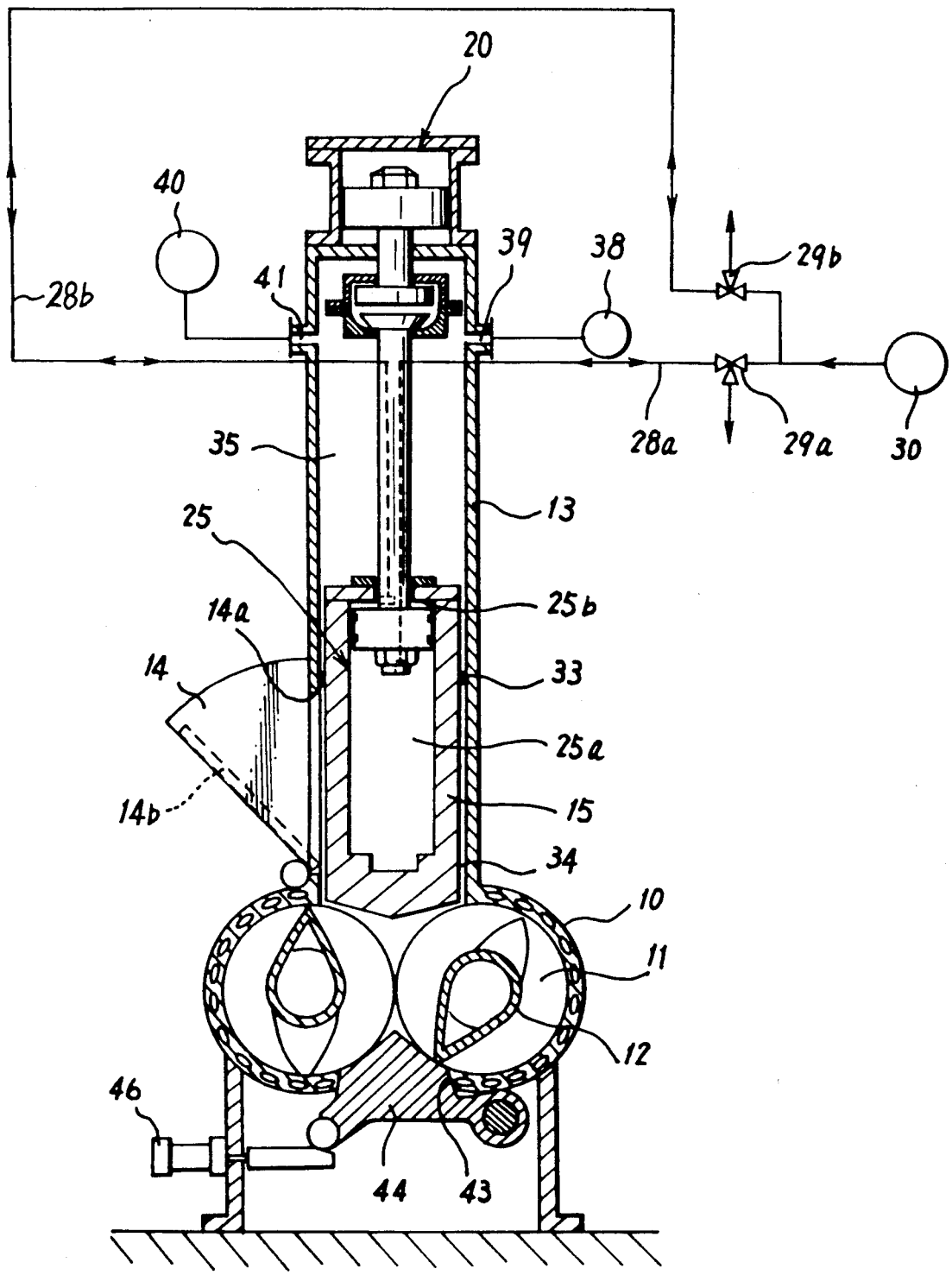
FIG. 2 is a view similar to FIG. 1 but showing the mixer in a mixing stage.

The floating weight 15 is so formed as to have an axial length which is sufficient for closing the opening 14a of the charge hopper 14 in the side wall of the hopper frame 13 when the floating weight 15 is in the lowered position (FIG. 2). Above the hopper opening 14a, a dust seal 33 is provided on the inner surface of the hopper frame 13 for sliding contact with the float weight 15. Accordingly, a clearance 34 of a large length is formed between the floating weight 15 and hopper frame 13 in the mixing stage, suppressing in cooperation with the dust seal 33 the eruptions of the mixing material powder from the mixing chamber 11 which would otherwise intrude through the clearance into the back pressure chamber 35 behind the floating weight 15 and deposit on the upper surface of the floating weight 15.

Further, the back pressure chamber 35 is provided with an air feed nozzle 39 which is in communication with the pressurized air source such as a blower or the like, and an air exhaust nozzle 41 which is in communication with a dust collector 40. Pressurized air is fed to the back pressure chamber 35 when the floating weight 15 is lowered in the mixing stage, thereby maintaining the back pressure chamber 35 at a higher pressure than the mixing chamber 11 to block the mixing material powder which might intrude into the back pressure chamber 35 through the dust seal 33.

In a non-mixing stage of the operation, the floating weight 15 is lifted up and the pressurized air in the back pressure chamber 35 is discharged through the air exhaust nozzle 41 into the dust collector 40 to remove dust from the exhaust air.

An outlet 43 is provided on the lower side of the casing 10 for ejecting the mixed product therethrough, the outlet 43 being openably closed by a drop door 44 which is pivotable about a shaft 45 and operated into open or closed position by an actuator which is mounted on the casing 10 thought not shown in the drawing. When closed, the door 44 is locked in that position by a lock cylinder 46.

In order to mix a material by means of the internal mixer of the above-described construction, the pressurized liquid is firstly supplied to the rod chamber 25b of the lift cylinder 25 to lift up the floating weight 15 into the position shown in FIG. 1, and a mixing material is charged into the mixing chamber 11 through the charge hopper 14. At this time, preferably compressed air is supplied to the rod chamber 20b of the pressurizing cylinder 20 to hold the piston 19 in the lifted position.

Nextly, while holding the piston 19 in the lifted position, the pressurized liquid is supplied to the head chamber 25a of the lift cylinder 25 to lower the floating weight into the position shown in FIG. 2. In this state, the 1st step mixing operation is carried out, pressing the floating weight against the mixing material by the liquid pressure without the cushioning effect.

Upon finishing the 1st step mixing, compressed air is supplied to the head chamber 20a of the pressurizing cylinder 20 to lower the piston 19, and the liquid pressure in the lift cylinder 25 is adjusted, if necessary, pressing the floating weight 15 against the mixing material resiliently with the pneumatic pressure while the charged material is mixed by the rotors. At this time, due to compressibility of air, the floating weight 15 is permitted to float up and down repeatedly according to the movements of the mixing material, accelerating the mixing of the charged material in a favorable manner by the floating actions.

As a result of the upward and downward floating actions of the weight 15, air in the mixing chamber 11 is urged to protrude into the clearance between the floating weight 15 and hopper frame 13 and then sucked into the mixing chamber 11 again together with mixing material powder, causing eruptions of powder into the clearance at the time of protrusion. However, since the back pressure chamber 35 behind the floating weight 15 and the clearance 34 are shielded from each other by the dust seal 33 on the hopper frame 13, there is no possibility of the powder erupting into the back pressure chamber 35 and depositing on the upper surface of the floating weight 15. Besides, when in the lowered position, the floating weight 15 with an axial length, which is sufficient for closing the opening 14a of the hopper 14 at one side of the hopper frame 13, forms a lengthy clearance 34 along the inner wall surface of the hopper frame 13. Accordingly, the pressure of erupting air is attenuated abruptly by frictional resistance while flowing through the clearance 34, and the powder entrained in the erupting air tends to fall by gravity midway of the clearance and return to the mixing chamber 11 as the erupted air is inhaled by an upward movement of the floating weight 15.

Further, in the mixing stage, pressurized air is supplied from the pressurized air source 38 to the back pressure chamber 35 through the air feed nozzle 39, maintaining the internal pressure of the back pressure chamber 35 at a level higher than that of the mixing chamber 11 to prevent intrusion of the mixing material powder into the back pressure chamber 35 through the dust seal 33.

Upon completion of the operation of the mixing stage, the drop door 44 is opened by the actuator to discharge the mixed product through the outlet 43. Then, the floating weight 15 is lifted up by the lift cylinder 25 to permit charging of the next batch of mixing material. As the floating weight 15 is elevated, the powder deposit on the side wall of the hopper frame is scraped off by the dust seal 33, while the air in the back pressure chamber 35 is exhausted through the air exhaust nozzle 41, separating and collecting dust in the exhaust air by the dust collector 40. The elevation of the floating weight 15 and the charging of material can be completed promptly by pre-charging the next batch of mixing material into the hopper 14 during the above-described mixing operation.

The mixer may be arranged to invert the mixing chamber 11 upside down at the time of discharging the mixed product. In such a case, it becomes possible to prevent deposition of the mixing material powder on the upper surface of the floating weight 15, and thus to preclude the pollution of the working environment with scattering dust.

The above-described mixer is preferred to be provided with a suitable liquid collecting means for collecting the pressurized operating liquid which leaks from the lift cylinder 25 of the hydraulic cylinder mechanism through the seal portion of the second piston rod 23. An example of such an operating liquid collecting means is shown in FIG. 3.

Figure 3:
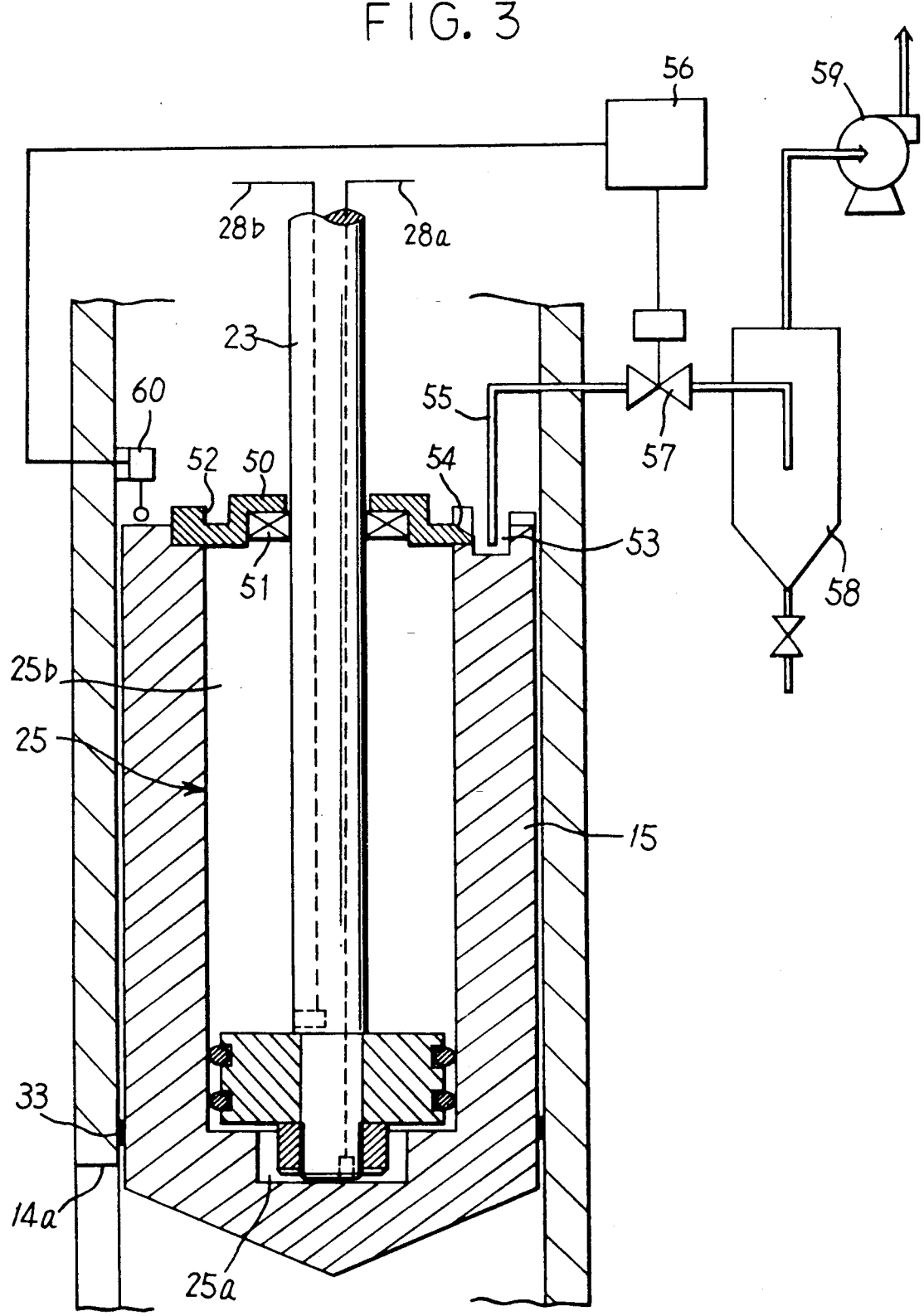
FIG. 3 is a sectional view on an enlarged scale of major components of the internal mixer with means for collecting leaked operating liquid.

In FIG. 3, a seal holder 50 is mounted on top of the floating weight 15 in such a manner as to embrace the Oil seal gasket 51, the seal holder 50 being provided with a liquid collecting groove 52 on its top surface around the second piston rod 23 to receive the operating liquid which leaks from the Oil seal gasket 51. A sink 53 which is formed at one side of the liquid collecting groove 52 is communicated with the latter through a passage 54. Provided internally of the back pressure chamber 35 is a suction nozzle 55 which is located in such a position where the fore end of the nozzle is plunged into the sink 53 when the floating weight 15 is lifted to the upper position, for sucking the operating liquid out of the sink 53. The suction nozzle 55 is connected to the liquid separation vessel 58 through the solenoid valve 57 which is opened and closed by the control unit 56. The liquid separation vessel 58 is connected to a vacuum pump 59 and thereby constantly maintained in a reduced pressure condition. On the other hand, a sensor 60 such as a limit switch or the like is provided within the back pressure chamber 35 to detect the elevation of the floating weight 15 to the upper lifted position. The output signal of the sensor 60 is supplied to the control unit 56.

Accordingly, if the elevation of the floating weight 15 to the upper lifted position is detected by the sensor 60 in a non-mixing stage of the operation, the control unit 56 opens the solenoid valve 57 in response to the detection signal from the sensor 60 to suck the operating liquid out of the sink 53 through the suction nozzle 55. It follows that the leaked operating liquid is collected in each cycle of operation.

Figure 4:
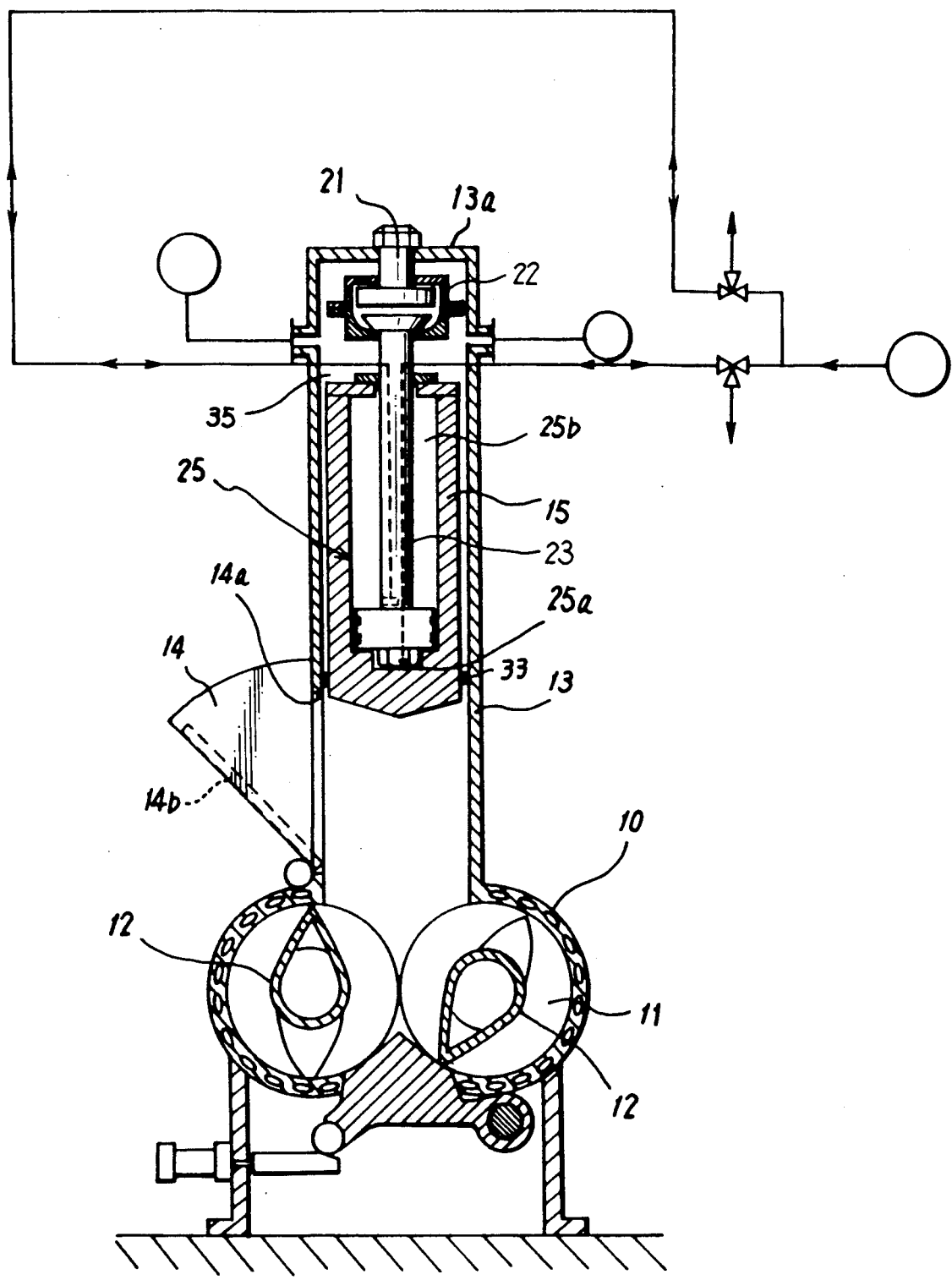
FIG. 4 is a sectional view of an internal mixer in another embodiment of the invention, showing the mixer in a non-mixing stage.
Figure 5:
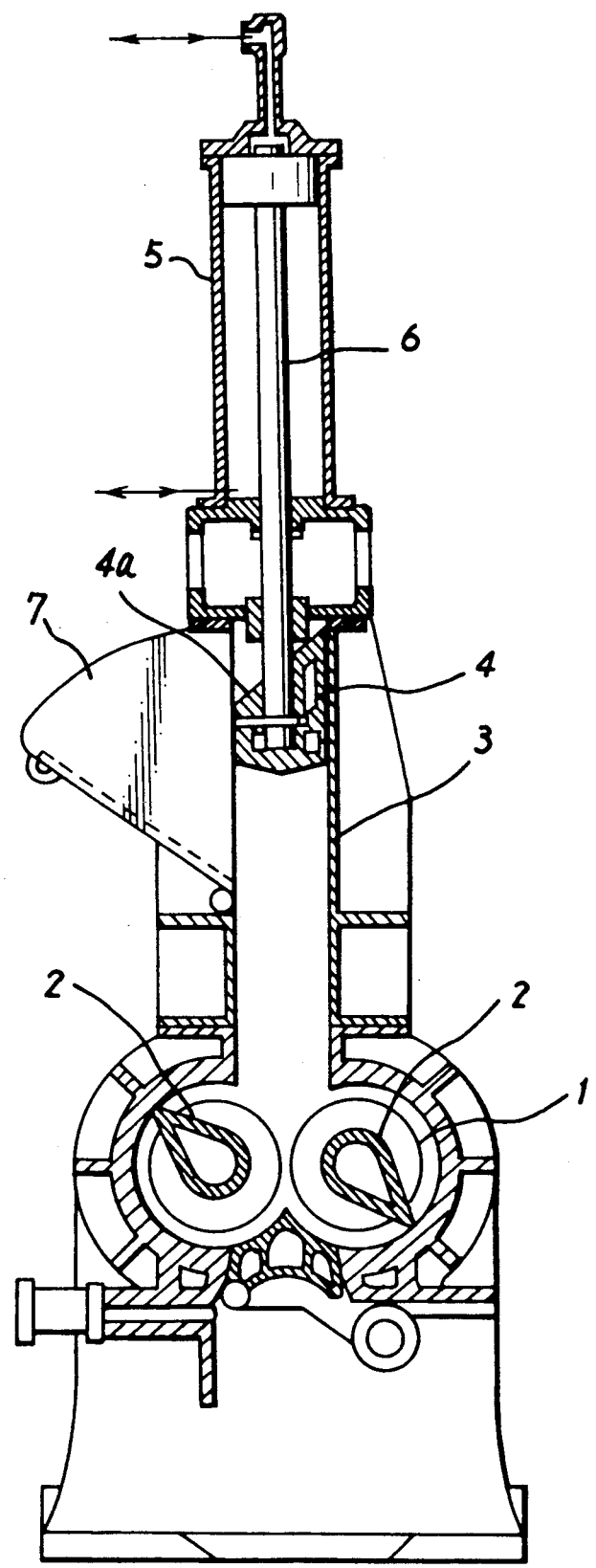
FIG. 5 is a sectional view of a conventional internal mixer in a non-mixing stage.
Figure 6:
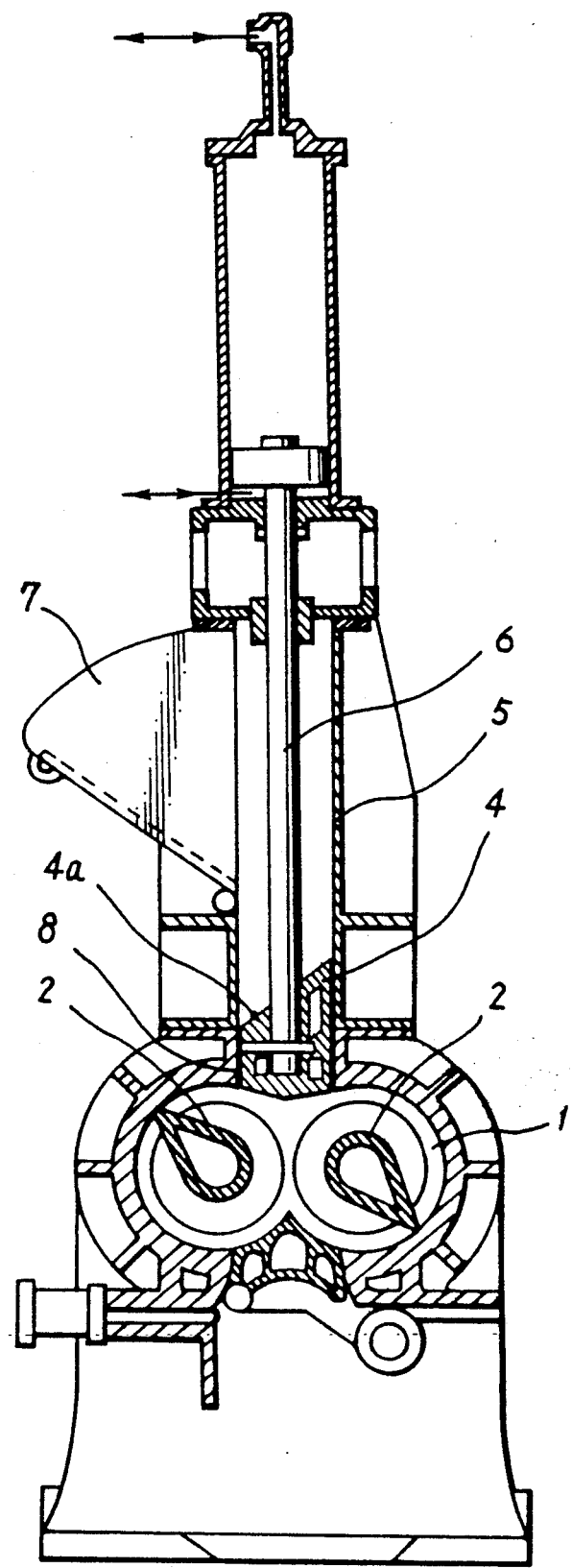
FIG. 6 is a view similar to FIG. 5 but showing the mixer in a mixing stage.

Although in the foregoing embodiment the vertical lift means for the floating weight is provided separately from the pressing means which presses the floating weight against the mixing material, the lift cylinder may be arranged to serve for both of the lifting and pressing operations, omitting the pressing cylinder as in the embodiment shown in FIG. 4. In the embodiment of FIG. 4, the first piston rod 21 is extended downward into the hopper frame 13 from a partition wall 13a at the top end of the hopper frame 13, and compressed air is used as an operating fluid for the lift cylinder 25 in both lifting and pressing operations. However, a pressurized liquid may be used in place of compressed air if desired. In such a case, the floating weight can be resiliently pressed against the mixing material by providing a buffer circuit, which confines an inert gas, within the length of the operating liquid supply circuit.

In other respects, the mixer of FIG. 4 is substantially same as the embodiment of FIG. 1 in construction and operation. Common component parts are designated by common reference numerals or characters, and their description is omitted to avoid unnecessary repetitions.

What is claimed is:

1. An internal mixer of the type including a mixing chamber rotatably accommodating mixing rotors therein, a hopper frame erected on said mixing chamber, a charge hopper provided on one lateral side of said hopper frame for charging a mixing material therethrough, and a floating weight provided in said hopper frame for upward and downward movements therein, said floating weight being held in an upper lifted position when charging a mixing material into said mixing chamber and then lifted down into a lower pressing position in a mixing stage to apply pressure on the charged material in said mixing chamber, characterized in that:

said floating weight is dimesioned to have an axial length sufficient for closing an inlet opening formed in the side wall of said hopper frame in communication with said charge hopper, when in said lower pressing position;

a pressing means for pressing said floating weight resiliently against said mixing material;

a lift means for lifting said floating weight up and down in said hopper frame, said lift means being provided separately from said pressing means and having a hydraulic cylinder mechanism including a hydraulic lift cylinder formed internally of said floating weight, a piston slidably received in said lift cylinder, a piston rod extended upward from said piston into said hopper frame, and a liquid tight seal through which said piston rod extends.

2. An internal mixer as defined in claim 1, wherein said pressing means is constituted by a pneumatic cylinder mechanism.

3. An internal mixer as defined in claim 2, wherein said pneumatic cylinder mechanism is constituted by a pneumatic pressing cylinder mounted at the top of said hopper frame, a piston slidably received in said pneumatic cylinder, and a piston rod extended hermetically into said hopper frame from said piston and linked to said piston rod of said hydraulic lift cylinder.

4. An internal mixer as defined in claim 3, wherein said piston rods are linked with each other through a vibration absorbing universal joint.

5. An internal mixer as defined in claim 1, wherein a seal member is provided on the inner wall surface of said hopper frame above said inlet opening and held in sliding engagement with said floating weight for blocking passage of mixing material powder.

6. An internal mixer as defined in claim 1, wherein a back pressure chamber is formed behind said floating weight in said hopper frame, said back pressure chamber being connectible to a pressurized air source to maintain an internal pressure higher than that of said mixing chamber.

7. An internal mixer as defined in claim 6, wherein said back pressure chamber is connected to a dust collector thereby to collect dust in exhaust air discharged from said back pressure chamber as said floating weight is elevated toward said upper lifted position.

8. An internal mixer as defined in claim 1, further comprising means for collecting the pressurized operating liquid leaked from said hydraulic lift cylinder.

9. An internal mixer as defined in claim 8, wherein said liquid collecting means is constituted by a liquid collecting groove and a sink formed on the upper surface of said floating weight for collecting and pooling the operating liquid leaked from said lift cylinder, a suction nozzle mounted within said hopper frame in such a position as to be dipped into said sink when said floating weight is lifted into said upper position, said suction nozzle being connected through a solenoid valve to a liquid separation vessel constantly maintained at a reduced pressure by a vacuum pump, a sensor for detecting if said floating weight is in said upper lifted position, and a control unit adapted to open said solenoid valve in response to a detection signal from said sensor.

10. A mixing apparatus comprising:

a mixing chamber rotatably accommodating mixing rotors therein;

a hopper frame extending upwardly from said mixing chamber, said hopper frame having a top ceiling wall and a lateral side wall;

an opening provided in the lateral side wall for charging a mixing material therethrough;

a floating weight provided in said hopper frame for upward and downward movements therein, said floating weight having an upper lifted position and a lower pressing position, said floating weight having an axial length sufficient to close said opening when said floating weight is in said lower pressing position;

a pressing means for providing a downward pressing force to said floating weight, said pressing means being provided on said top ceiling wall;

a rod extending downwardly from the pressing means into the hopper frame through said top ceiling wall;

a hydraulic lift cylinder provided inside the floating weight for moving said floating weight between said upper lifted position and said lower pressing position; and a piston rod extending upwardly from said floating weight and adapted to communicate with the rod extending from the pressing means to transfer a pressing force from said pressing means to said floating weight.

* * * * *